(12) United States Patent
Hodge et al.

(10) Patent No.: US 9,323,021 B2
(45) Date of Patent: Apr. 26, 2016

(54) EMBEDDED OPTICAL FIBER TERMINATION DEVICE

(75) Inventors: Malcolm H. Hodge, Chicago, IL (US); James P. Clarkin, Scottsdale, AZ (US)

(73) Assignee: Molex, LLC, Lisle, IL (US)

( * ) Notice: Subject to any disclaimer, the term of this patent is extended or adjusted under 35 U.S.C. 154(b) by 499 days.

(21) Appl. No.: 13/636,511

(22) PCT Filed: Mar. 23, 2011

(86) PCT No.: PCT/US2011/029519
§ 371 (c)(1),
(2), (4) Date: Nov. 13, 2012

(87) PCT Pub. No.: WO2011/119667
PCT Pub. Date: Sep. 29, 2011

(65) Prior Publication Data
US 2013/0101259 A1    Apr. 25, 2013

Related U.S. Application Data

(60) Provisional application No. 61/316,597, filed on Mar. 23, 2010.

(51) Int. Cl.
*G02B 6/44* (2006.01)
*G02B 6/38* (2006.01)
*G02B 6/36* (2006.01)

(52) U.S. Cl.
CPC ............ *G02B 6/4471* (2013.01); *G02B 6/3874* (2013.01); *G02B 6/3897* (2013.01); *G02B 6/3608* (2013.01); *Y10T 29/49815* (2015.01)

(58) Field of Classification Search
None
See application file for complete search history.

(56) References Cited

U.S. PATENT DOCUMENTS

| | | | |
|---|---|---|---|
| 4,806,012 A | 2/1989 | Meltz et al. | |
| 5,399,854 A | 3/1995 | Dunphy et al. | |
| 5,661,834 A * | 8/1997 | Watanabe et al. | 385/92 |
| 6,000,977 A | 12/1999 | Haake | |
| 6,035,084 A | 3/2000 | Haake et al. | |
| 6,547,448 B2 | 4/2003 | Johnson et al. | |
| 6,840,683 B2 * | 1/2005 | Takeda et al. | 385/60 |
| 7,513,696 B2 * | 4/2009 | Wada et al. | 385/88 |
| 8,911,433 B2 * | 12/2014 | Hixon et al. | 606/16 |
| 2001/0054682 A1 | 12/2001 | Bennett et al. | |
| 2002/0172470 A1 | 11/2002 | Johnson et al. | |

FOREIGN PATENT DOCUMENTS

KR    2000-0065831 A    11/2000

OTHER PUBLICATIONS

International Search Report for PCT/US2011/029519.

* cited by examiner

*Primary Examiner* — John M Bedtelyon
(74) *Attorney, Agent, or Firm* — Jeffrey K. Jacobs

(57) ABSTRACT

An embedded optical fiber termination device includes a fiber holder with an inner bore and an outer surface. The inner bore is configured to receive a length of optical fiber therein. A removable armature is positioned about a portion of the outer surface of the fiber holder and is removably positioned around a portion of the fiber holder. A composite structure and a method of using the embedded device are also provided.

14 Claims, 10 Drawing Sheets

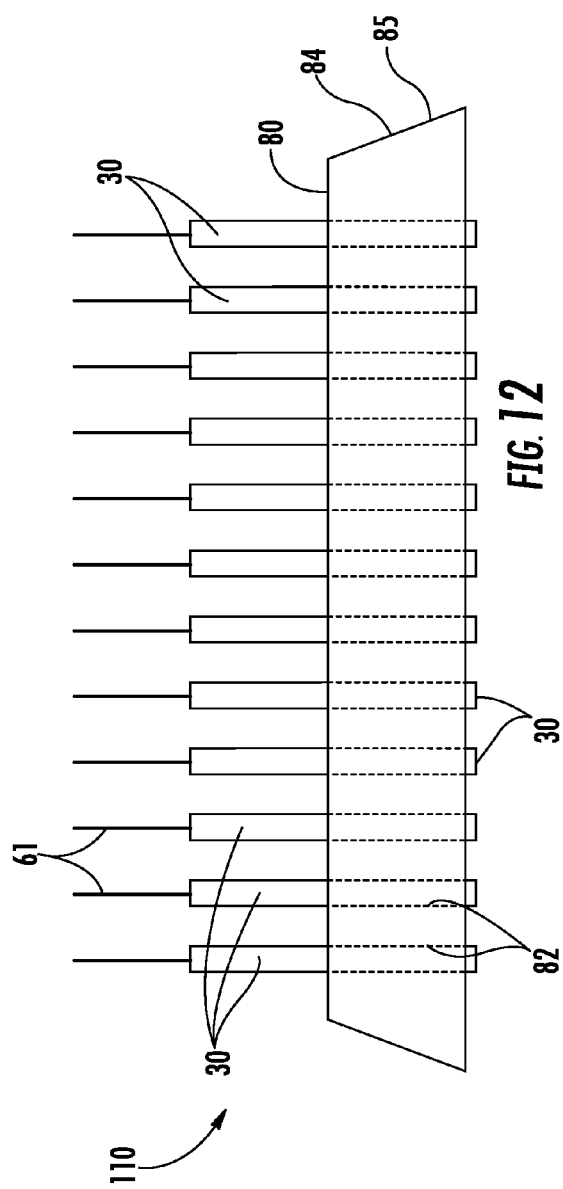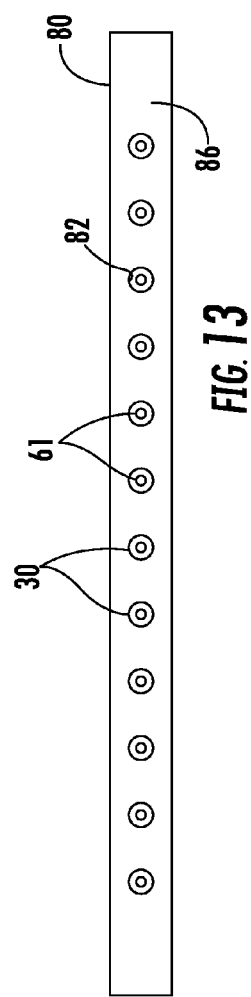

EMBEDDED OPTICAL FIBER TERMINATION DEVICE

REFERENCE TO RELATED DISCLOSURE

The Present Disclosure claims priority to U.S. Provisional Patent Application No. 61/316,597, entitled "Embedded Optical Fiber Termination Device," filed on 23 Mar. 2010 with the United States Patent And Trademark Office. The content of the aforementioned Patent Application is fully incorporated in its entirety herein.

BACKGROUND OF THE PRESENT DISCLOSURE

The Present Disclosure relates generally to optical fiber termination devices and, more particularly, to a device for positioning an optical fiber embedded in a composite structure.

Composite structures such as panels and beams are used in many applications including the aerospace and automotive industries. In some applications, it is desirable to embed optical fibers within the structure, either as paths for communication or as fiber optic sensors such as for monitoring the strain to which the composite material is or has been subjected. One such type of strain sensor involves embedding an optical fiber having reflective elements, known as a Fiber Bragg Grating ("FBG"), within the layers of the composite material. Shifts in strain may be determined by transmitting a known light source through the FBG and monitoring changes in the wavelength of light reflected back by the FBG.

Composite structures are typically formed of a plurality of sheets or plies of fabric-like material with a bonding agent between or around the plies. During the forming or layup process, the plies are positioned in a desired pattern with the bonding agent between each of the plies and optical fibers may be positioned in a desired location between the layers. Depending upon the process being used, the structure is then typically heated or cured at an elevated temperature, which in some instances may occur at approximately 350° C.

It is often desirable for the optical fibers embedded within the composite structure to exit at an edge of the structure. However, composite panels are often manufactured to a general length and then trimmed afterwards to a specific, desired length. If the embedded optical fibers are cut as the composite panel is trimmed, the optical fibers must be subsequently located and terminated. Cost effective and small sized termination and polishing of the cut optical fibers post-trimming has proven difficult and time consuming. Accordingly, an improved device for positioning and terminating optical fibers along an edge of a composite structure is desired.

SUMMARY OF THE PRESENT DISCLOSURE

An optical fiber positioning assembly is provided for embedding within a structure. The positioning assembly includes a fiber holder with an inner bore and an outer surface. The inner bore is configured to receive a length of optical fiber therein. A removable armature is positioned about a portion of the outer surface of the fiber holder and is removably positioned around a portion of the fiber holder.

If desired, the removable armature may be chemically removable. The removable armature may be formed of glass and may be chemically removable through contact with acetic acid. The removable armature may be slidably removable from the fiber holder by movement along the fiber holder in a direction generally parallel to a longitudinal axis through the inner bore of the fiber holder. The removable armature may be formed of a molded silicone material. An adhesion agent may be located between the fiber holder and the removable armature to increase the force required to remove the removable armature from the fiber holder. A plurality of spaced apart, generally parallel fiber holders may be provided with each configured to receive a length of an optical fiber therein. The removable armature may be positioned about a portion of each of the fiber holders.

If desired, the removable armature may be formed of a molded silicone material. An alignment block may be secured to at least some of the fiber holders. The alignment block may be positioned about one section of the fiber holders and the removable armature may be positioned about another section of the fiber holders. The alignment block may include an alignment guide and access to the alignment guide may be limited by the removable armature. The fiber holder may be generally tube shaped. The fiber holder may be a silica capillary with an inner bore having a diameter of approximately 125 microns and an outer surface having a diameter of approximately 1.25 millimeters.

An assembly may include a composite structure having a plurality of layers and an edge including an opening therein. An optical fiber may be embedded within the composite structure with an alignment member having a bore extending therethrough and including first and second sections. The first section is positioned within the opening of the composite structure, and the second section extends out of the composite structure and is configured to receive a mating optical fiber member. A fiber holder has an inner bore and is positioned within the first section of the alignment member and a length of the optical fiber is located within the inner bore of the fiber holder.

If desired, a plurality of spaced apart, generally parallel fiber holders may be provided with each having a length of an optical fiber therein. Each fiber holder being positioned within the opening of the edge of the composite structure. An alignment block may be provided within the composite structure and secured to at least some of the fiber holders. A plurality of alignment bores may be provided with a first section of each alignment bore being positioned within the opening of the composite structure, and a second section of each alignment bore extending out of the composite structure and being configured to receive a mating optical fiber member therein.

A method of terminating an embedded optical fiber may include providing an optical fiber positioning assembly with a fiber holder having a length of optical fiber therein and a removable armature positioned about a portion of the fiber holder. A structure may be formed with the optical fiber positioning assembly embedded therein and extending across a cut line along which the structure will be cut. The structure may be cut along the cut line and through the optical fiber positioning assembly to expose a remaining portion of the removable armature positioned adjacent an edge of the structure. The remaining portion of the removable armature may be removed from adjacent the edge of the structure to create an opening in the edge of the structure with an operative portion of the fiber holder and an operative portion of the optical fiber located therein.

If desired, an exposed end of the operative portion of the optical fiber may be polished. An alignment sleeve having first and second sections may be provided and, after the removing step, the first section of the alignment sleeve may be inserted into the opening in the edge of the structure while maintaining the second section outside the opening in the edge and with the exposed end of the optical fiber positioned within the first section of the alignment sleeve. The removing step may include sliding the removable armature from the operative portion of the fiber holder. The sliding step may include sliding the removable armature in a direction generally parallel to a longitudinal axis of the optical fiber. The removing step may include chemically removing the removable armature. The removable armature may be formed of glass and the removing step may include exposing the removable armature to acetic acid.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 12 is a top plan view of another alternate embodiment depicting an optical fiber positioning assembly for use with multi-fiber applications; and FIG. 13 is a front elevational view of the multi-fiber positioning assembly of FIG. 12.

DESCRIPTION OF THE PREFERRED EMBODIMENTS

While the Present Disclosure may be susceptible to embodiment in different forms, there is shown in the Figures, and will be described herein in detail, specific embodiments, with the understanding that the disclosure is to be considered an exemplification of the principles of the Present Disclosure, and is not intended to limit the Present Disclosure to that as illustrated.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
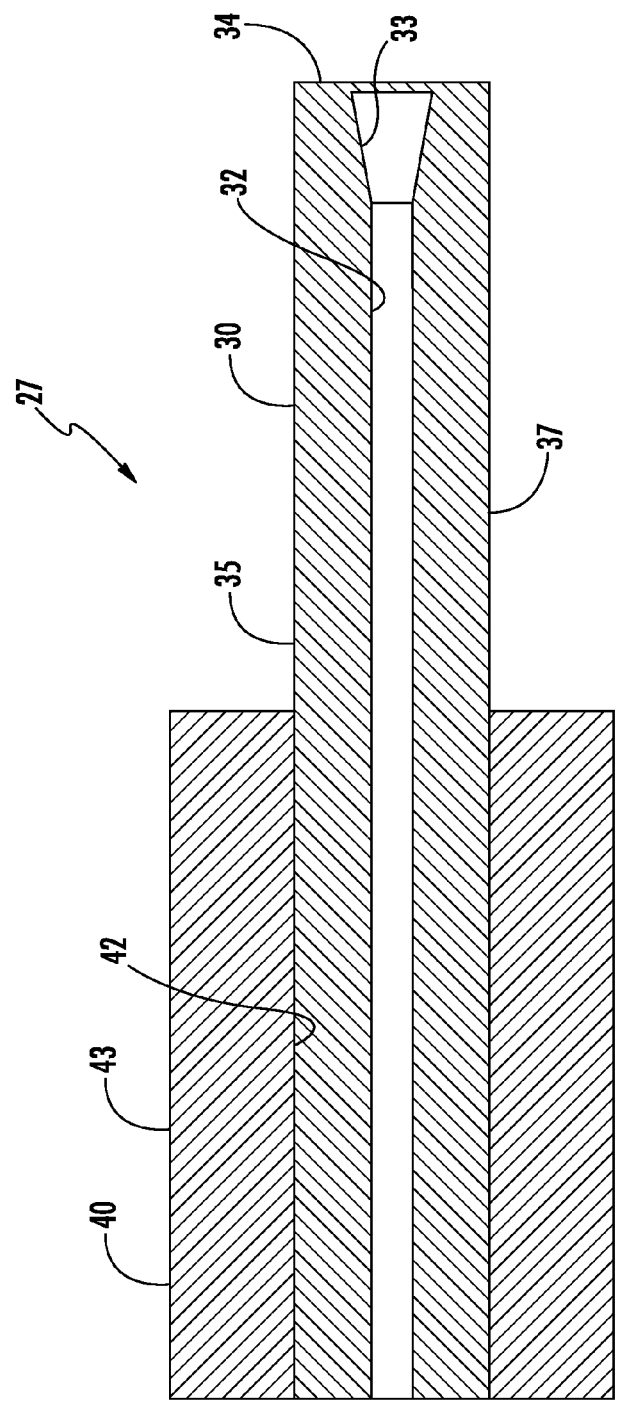
FIG. 1 is a cross-sectional view of the optical fiber positioning assembly.
Figure 6:
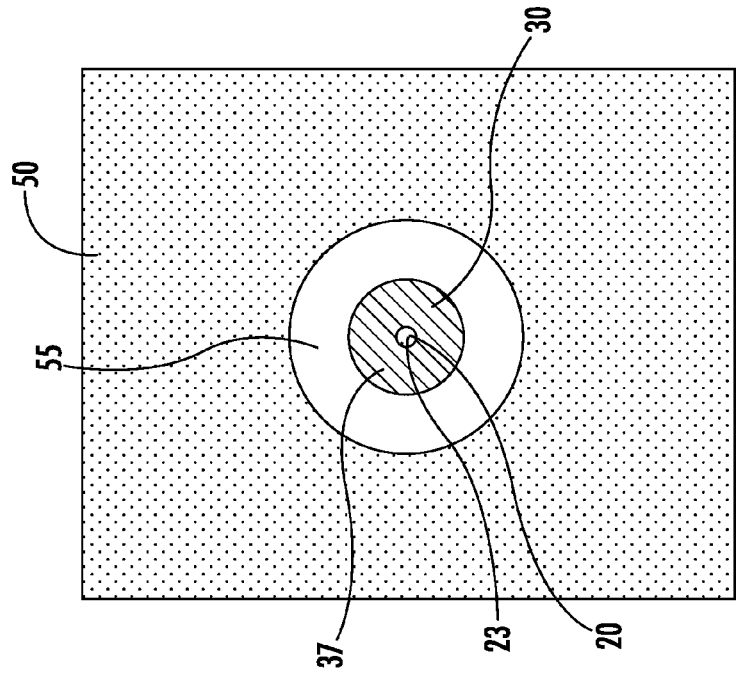
FIG. 6 is an enlarged end elevational view of the trimmed edge of the structure of FIG. 3 showing the optical fiber positioning assembly and optical fiber embedded therewithin.
Figure 7:
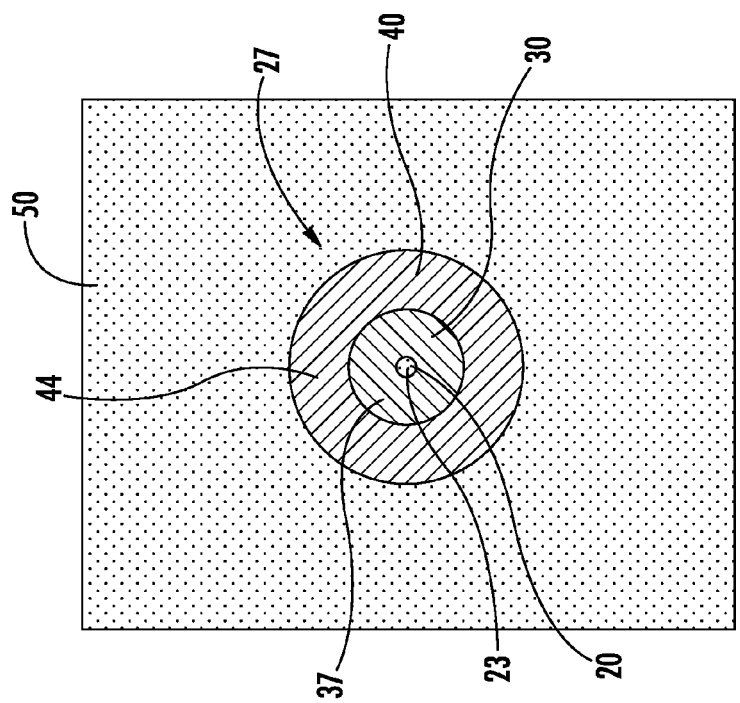
FIG. 7 is an enlarged end elevational view similar to that of FIG. 6, but with the removable armature removed as depicted in FIG. 5.
Figure 8:
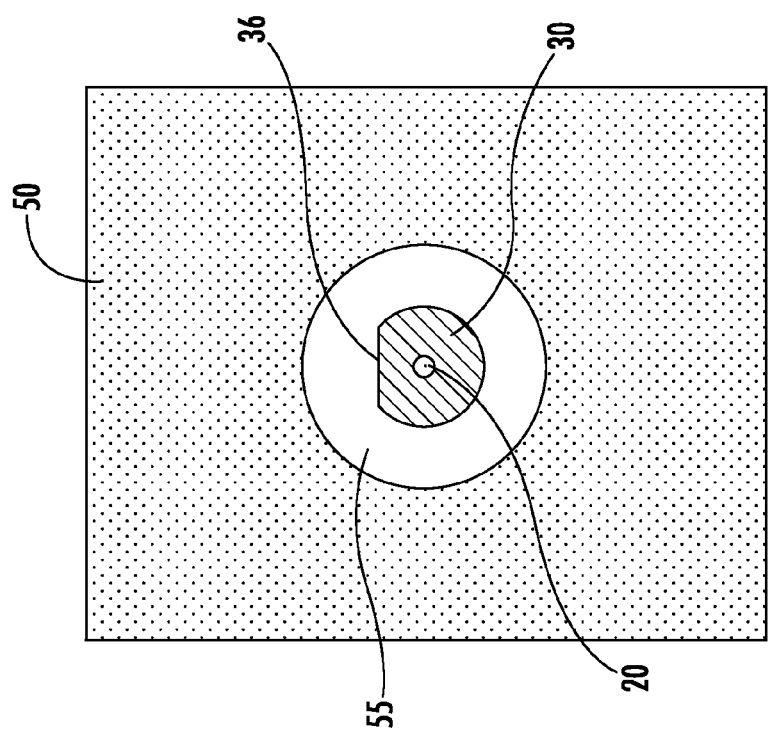
FIG. 8 is an enlarged end elevational view similar to that of FIG. 7, but depicting an alternate embodiment of the fiber holder.
Figure 9:
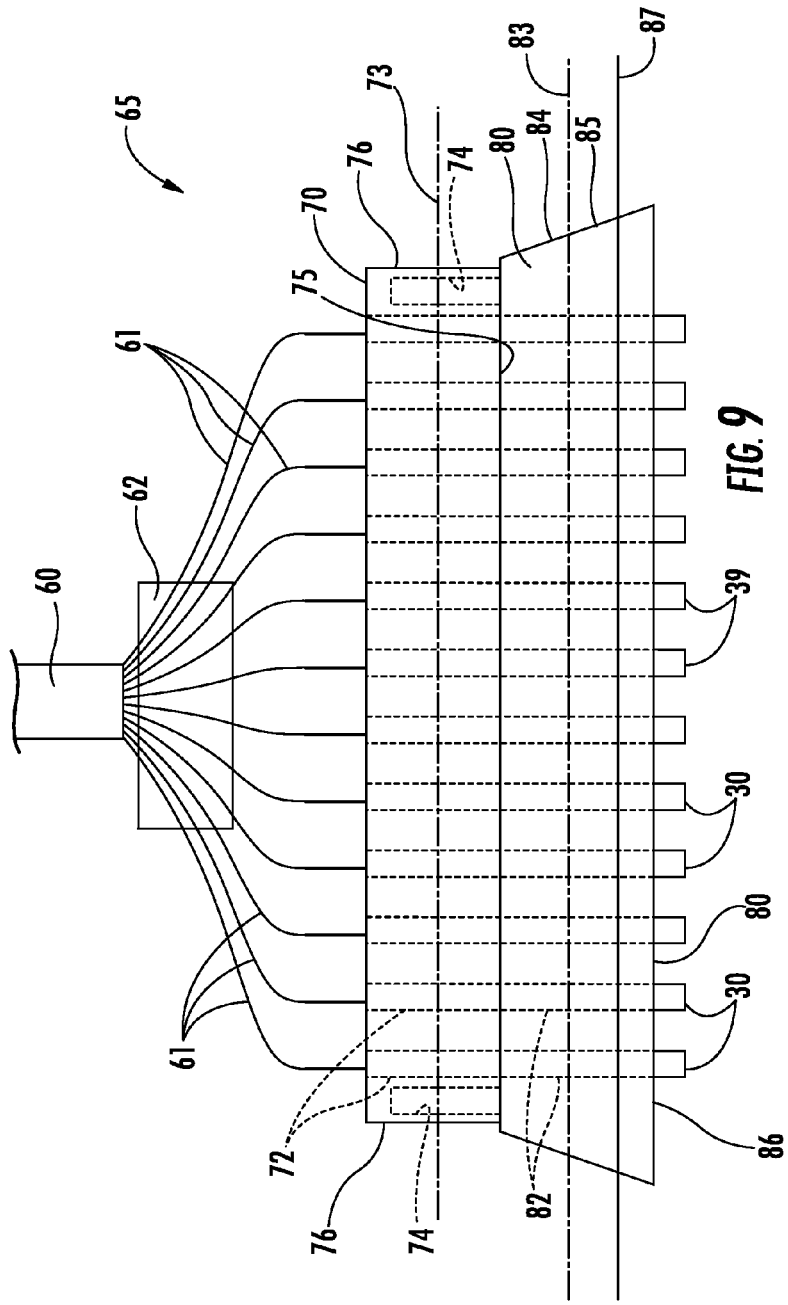
FIG. 9 is a top plan view of an alternate embodiment depicting an optical fiber positioning assembly for use with multi-fiber applications.
Figure 10:
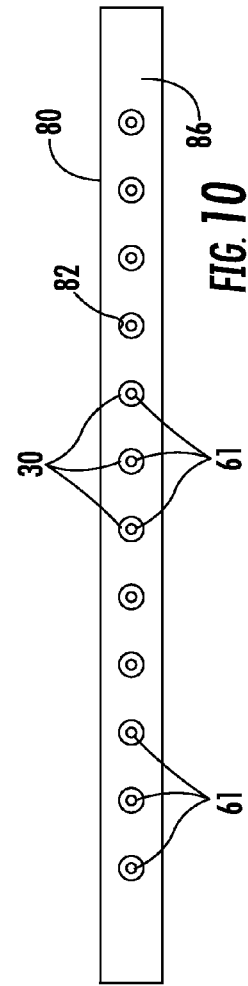
FIG. 10 is a front elevational view of the multi-fiber positioning assembly of FIG. 9.
Figure 11:
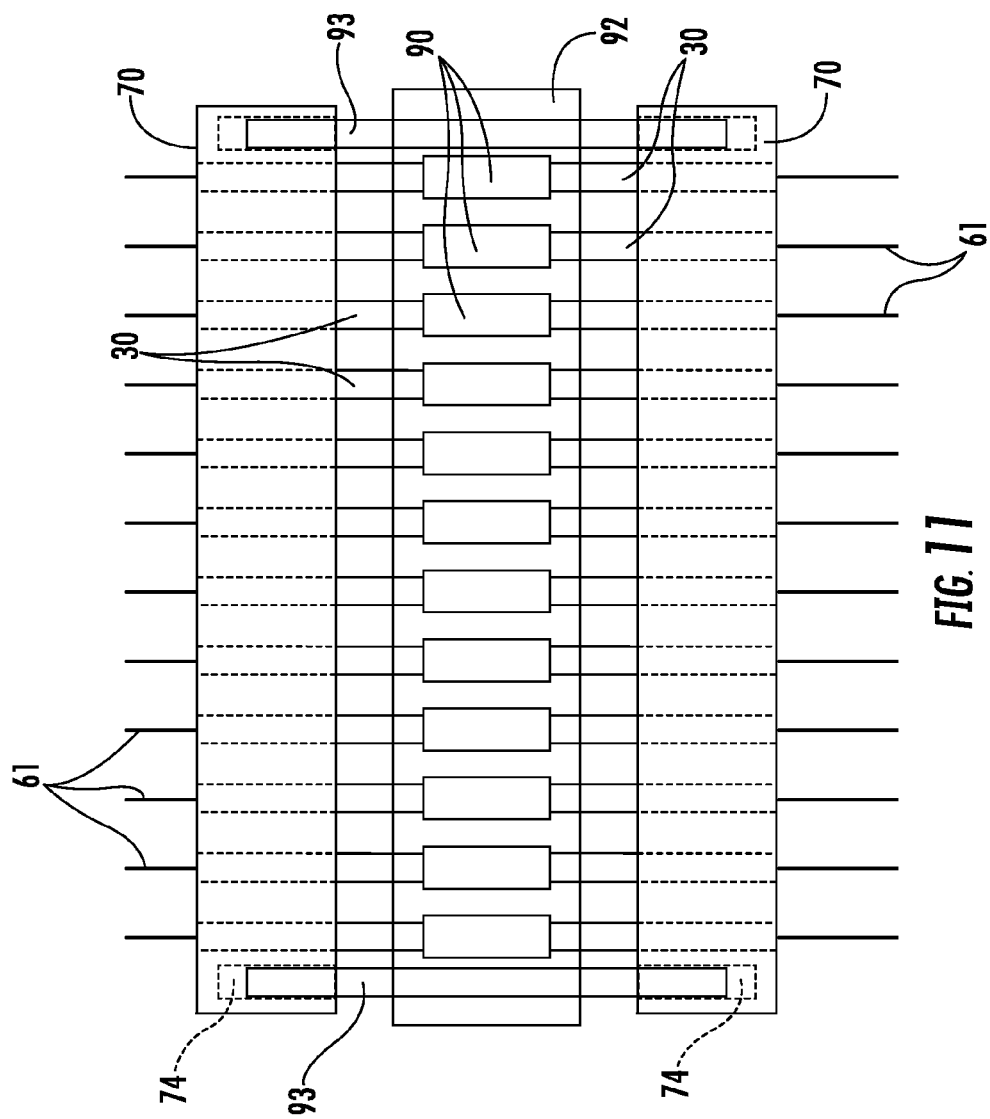
FIG. 11 is a top plan view of a pair of the multi-fiber positioning assemblies of FIG. 9 with their removable blocks removed and mated together.

Referring to FIGS. 1 and 6, an optical fiber positioning assembly or device 27 for a single optical fiber 20 is depicted. The positioning assembly includes an elongated fiber holder 30 and an outer removable member or armature 40 positioned around an end of fiber holder 30. Fiber holder 30 is a generally cylindrical or tube-shaped elongated structure for holding, protecting and accurately positioning an optical fiber inserted therein. The fiber holder 30 includes a circular, centrally located bore 32 for receiving a length of optical fiber 20 therein. Positioning assembly 27 may be embedded in a structure 50 such as a composite panel, beam or other member to facilitate and simplify subsequent termination and polishing of optical fiber 20.

It should be noted that in this description, representations of directions such as up, down, left, right, front, rear, and the like, used for explaining the structure and movement of each part of the disclosed embodiment are not intended to be absolute, but rather are relative. These representations are appropriate when each part of the disclosed embodiment is in the position shown in the figures. If the position or frame of reference of the disclosed embodiment changes, however, these representations are to be changed according to the change in the position or frame of reference of the disclosed embodiment.

Fiber holder 30 is configured with a central bore 32 that is slightly larger than the diameter of optical fiber 20 and has a tapered inlet 33 adjacent fiber insertion end 34 to facilitate the insertion of the optical fiber 20 into the fiber holder. Fiber holder 30 is depicted with a circular outer surface 35 but such surface may be configured in other shapes, as desired. The diameter and shape of outer surface 35 may be changed provided that the fiber holder 30 may be appropriately received and retained within removable armature 40.

In one embodiment, fiber holder 30 may be formed of an extruded silica precision capillary with a central bore 32 having a diameter of 125 microns and an outer surface 35 having a diameter of 1.25 millimeters. In some circumstances, it may be desirable to choose these dimensions to permit fiber holder 30 to receive a standard sized optical fiber and also permit polishing of the fiber holder 30 and the optical fiber 20 with standard polishing equipment that is generally used for polishing similarly sized ferrules and fiber. Other materials and structures, such as ceramic ferrules or high temperature plastic, rather than the extruded capillary, could be used as a fiber holder provided that such structure holds, protects and accurately positions optical fiber 20. If optical fibers having a different diameter are to be used, the diameter of bore 32 would be appropriately changed. As depicted, the size of bore 32 of fiber holder 30 relative to the diameter of outer surface 35 of fiber holder 30 is exaggerated for clarity.

Removable armature 40 is depicted as a generally tubular-shaped component configured to be temporarily positioned around fiber holder 30 while the composite structure is being formed and then subsequently removed after trimming the edge of the composite structure. In other words, armature 40 is a component that occupies physical space within the composite structure during the manufacturing process and is subsequently removed to leave a void within or at the edge of the composite structure. Removable armature 40 is generally tube-shaped with a circular inner bore 42 and a circular outer surface 43. The inner bore is configured so as to closely match the shape of the outer surface 35 of fiber holder 30. The shape and dimensions of the outer surface 43 may be chosen so that the void or opening remaining after removal is large enough to permit access to and subsequent polishing or other processing of the end of the optical fiber 20 as described below, but small enough so as not to negatively impact the structural integrity of the composite material 50.

In one embodiment, the removable armature 40 is formed of a chemically removable material such as a dissolvable or leachable glass. In such case, the optical fiber positioning assembly 27 could be formed by first creating a silica preform having desired dimensions and then collapsing a dissolvable or leachable glass around the silica preform to create a composite preform that may be drawn to create the positioning assembly having the desired dimensions. As depicted in FIG. 1, removable armature 40 is shorter in length than fiber holder 30 so that the exposed portion 37 of fiber holder 30 is not surrounded by removable armature 40. This can be achieved by dissolving or leaching the portion of removable armature 40 that surrounded exposed portion 37 through the use of a chemical compound such as acetic acid or by laser cutting a portion of the removable armature. Once the positioning assembly 27 is embedded in composite structure 50, the exposed portion 37 of fiber holder 30 will be engaged by and secured within the composite structure 50.

In some instances, such as if the optical fiber extending through the composite structure is polarized, it may be desirable to include one or more flat surfaces 36 on the outer surface 35 of fiber holder 30 in order to establish a reference so that the polarized optical fibers are properly oriented when they are subsequently mated. During the manufacturing process, the flat surface 36 may be formed as part of the silica preform used to form the fiber holder 30 and the chemically dissolvable glass used to create the armature 40 is then collapsed around the silica preform. The removable armature 40 would thus have an inner bore 42 identically configured to the outer surface 35 of fiber holder 30 including the flat surface 36 of fiber holder 30.

Figure 2:
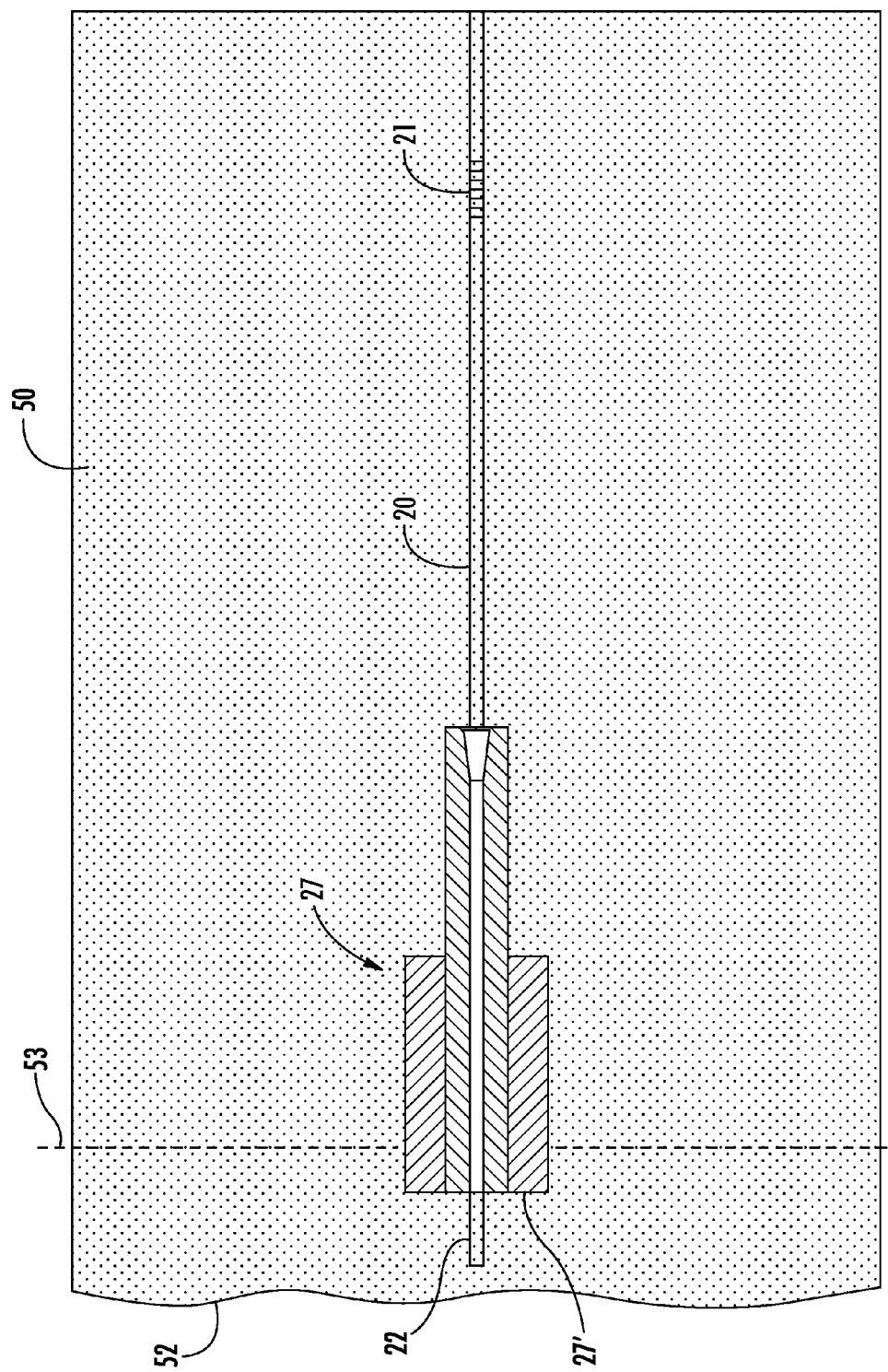
FIG. 2 is a cross-sectional view of the optical fiber positioning assembly of FIG. 1 with an optical fiber located therein and positioned within a composite structure.

During the process of manufacturing the composite structures, the various plies or layers (not shown) are stacked and consolidated to form the desired composite structure 50 with a length of optical fiber 20 positioned between certain layers. In addition, if desired, an optical sensor such as a Fiber Bragg Grating 21 may be included within a length of the optical fiber positioned in the composite structure. Either before, during or after the process of laying the optical fiber 20 between the plies that ultimately form the composite structure 50, end 22 of optical fiber 20 is slid into inlet 33 at insertion end 34 of fiber holder 30 and into bore 32 of the fiber holder. If desired, an epoxy or other material (e.g., the bonding agent or "prepreg" used to secure together the various plies of the composite structure) could be applied to the bore 32 of fiber holder 30 in order to secure the optical fiber 20 to fiber holder 30. The optical fiber positioning assembly 27 having the optical fiber 20 inserted therein will typically, but not necessarily, be positioned generally adjacent a rough edge 52 of the composite structure. In each instance, positioning assembly 27 and optical fiber 20 extend across or span line 53 (FIG. 2) at which the composite structure will be cut in order to form a desired finished edge 54 of the structure.

Figure 3:
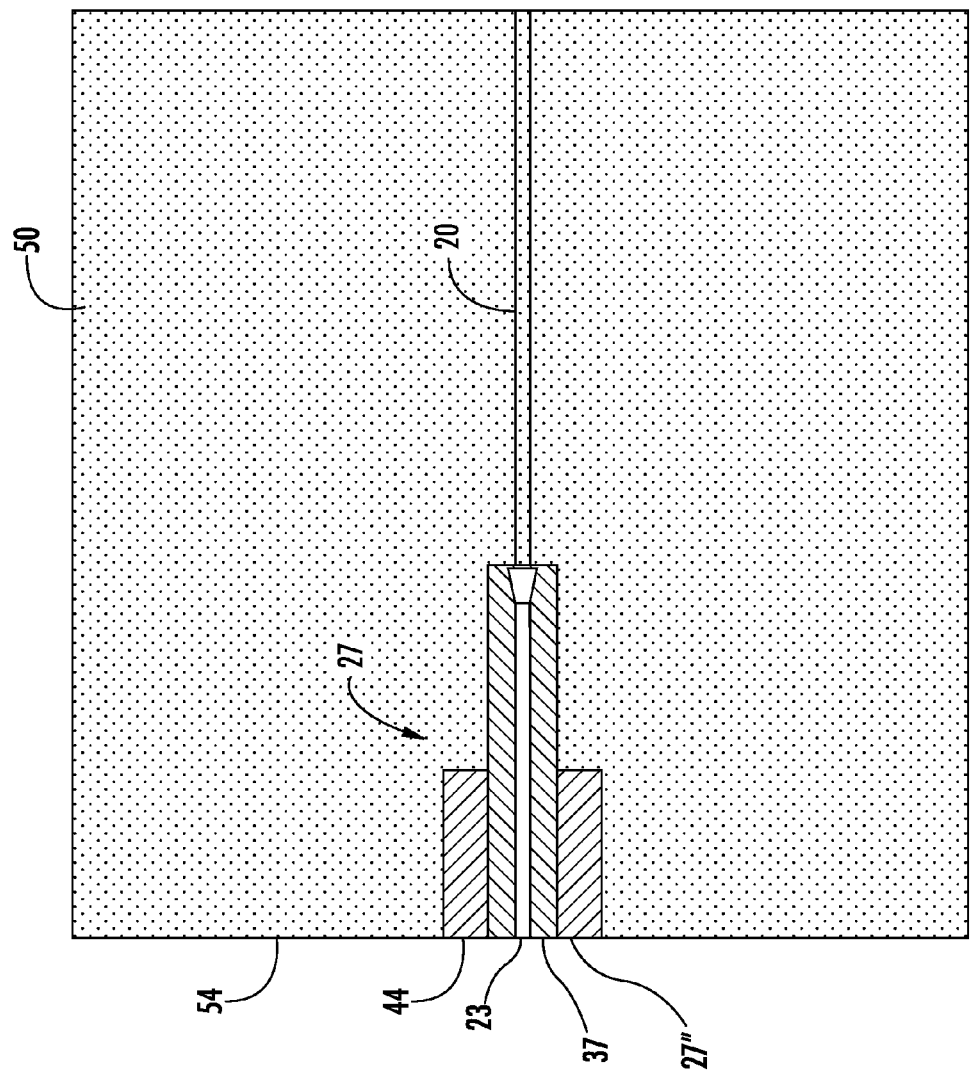
FIG. 3 is a cross-sectional view similar to that of FIG. 2, with the composite structure, optical fiber positioning assembly and optical fiber trimmed to create a desired edge.
Figure 4:
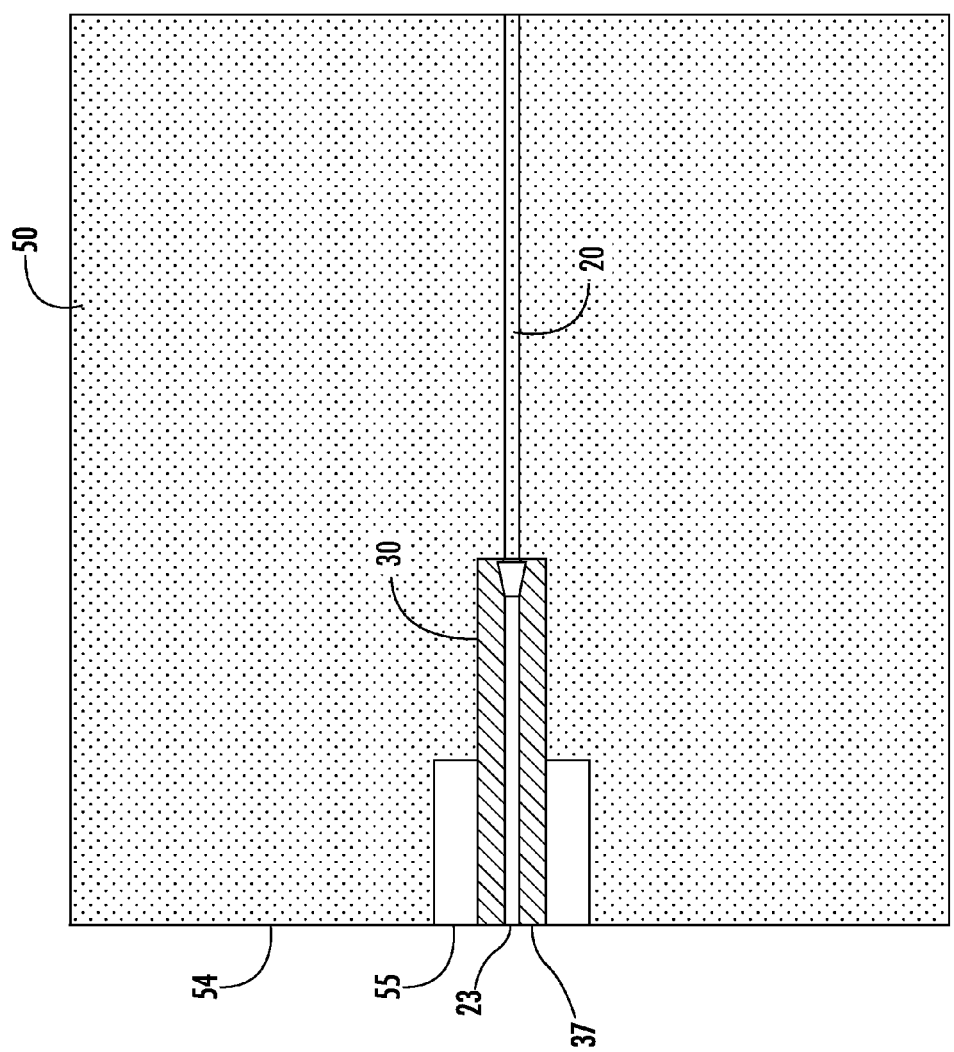
FIG. 4 is a cross-sectional view similar to that of FIG. 3, but with the removable armature of the optical fiber positioning assembly removed.

Upon cutting the structure 50 at cut line 53, optical fiber positioning assembly 27 and optical fiber 20 are likewise cut along line 53 leaving ends thereof aligned with finished edge 54 (FIG. 3). More specifically, the free or distal end 27' of positioning assembly 27 and the free or distal end 22 of optical fiber 20 are positioned on one side of line 53 (to the left in FIG. 3) and the remaining portions of positioning assembly 27, optical fiber 20 and structure 50 are positioned on the opposite side so that the free ends are removed with the rough edge 32 of structure 50 during the cutting process. This creates the finished edge 54 of structure 50, and the aligned finished end 37 of fiber holder 30, finished end 44 of removable armature 40 and finished end 23 of optical fiber 20.

An appropriate chemical solution or compound or other dissolving agent may then be applied to removable armature 40 in order to dissolve the armature without harming the composite material. In one example, acetic acid may be used to dissolve or leach the removable armature 40. Removal of armature 40 results in an opening or void 55 formed in the finished edge 54 of structure 50 that is the size and shape of the remaining portion of the removable armature 40. It is desirable for the opening 55 to be sufficiently large so as to permit polishing of the finished end 23 of optical fiber 20 and the finished end 37 of fiber holder 30, yet be sufficiently small so as not to affect the structural integrity of the composite structure 50.

Figure 5:
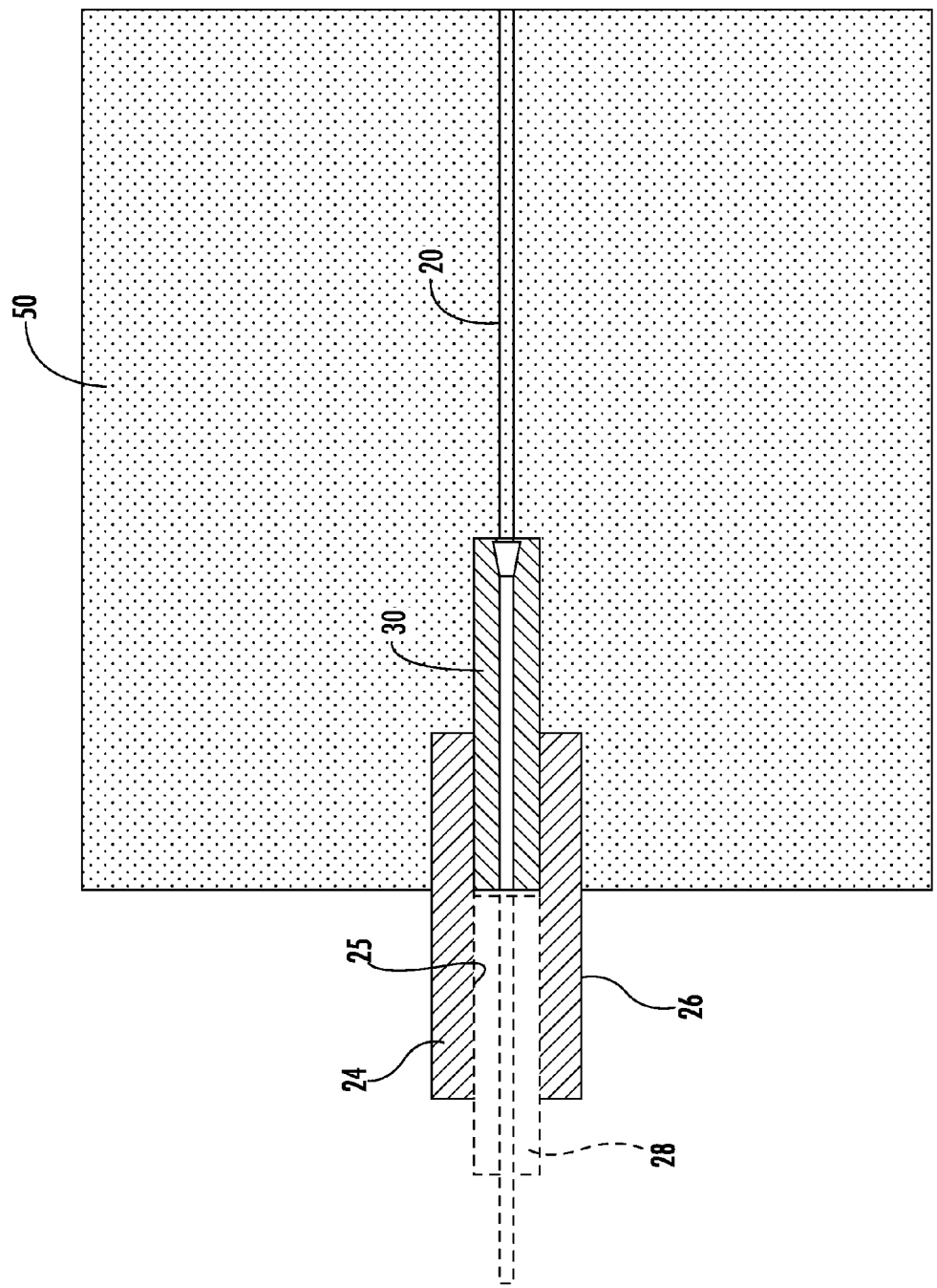
FIG. 5 is a cross-sectional view similar to that of FIG. 4, but with an alignment sleeve inserted along the edge of the composite structure.

Once the removable armature has been removed from the finished edge of structure 50, the finished end 23 of optical fiber 20 and the finished end 37 of fiber holder 30 may be polished to a desired finish and/or shape. A cylindrical alignment sleeve 24 (FIG. 5) is provided that has an inner bore 25 substantially identical to the dimension of the outer surface 35 of fiber holder 30 and an outer surface 26 dimensioned to be substantially identical to the opening 55 in structure 50. In other words, the cross-sectional dimensions of alignment sleeve 24 are substantially identical to those of removable armature 40. One end of the alignment sleeve is then inserted into the opening 55 in structure 50 so that the finished end 23 of optical fiber 20 and the finished end 37 of fiber holder 30 are positioned within the bore 25 of alignment sleeve 24. Alignment sleeve 24 is sufficiently long so as to extend into opening 55 with the finished end 23 of optical fiber 20 and the finished end 37 of fiber holder 30 accurately positioned within alignment sleeve 24 and with a sufficient length of alignment sleeve 24 extending from opening 55 so as to permit insertion and proper alignment of an external optical fiber assembly 28.

In an alternate embodiment, the removable armature 40 may be formed separately from fiber holder 30 and positioned on the fiber holder or molded over the fiber holder 30. In both cases, this could occur after the fiber holder is formed and cut to its desired length. Through such structures, a removable armature 40 would be mounted on each fiber holder 30 and temporarily secured thereto. The fiber holder 30 could be dimensioned, configured and manufactured substantially as or identically to the fiber holder with respect to the dissolvable, removable armature described above. The separately formed removable armature could also be dimensioned and configured substantially as or identically to that described above. However, it is also possible that the inner bore 42 of the removable armature could be larger or somewhat differently shaped as compared to the outer surface 35 of fiber holder 30 so long as the removable armature is sufficiently retained on fiber holder 30.

It is believed that a variety of materials could be used to form the removable armature such as silica, ceramic, metal, silicone and other materials that will not be negatively affected by the manufacturing process utilized for the composite structure. Depending on the materials used to form removable armature 40, it may be desirable to add a substance or compound between the fiber holder 30 and the removable armature 40 in order to create or improve a temporary bond between the fiber holder and the armature. Such compounds could include a releasable adhesive or wax that is sufficient to secure the fiber holder 30 and removable armature 40 together during handling of the positioning assembly 27 and formation of the composite structure, yet permit subsequent removal of armature 40 by applying a relatively low temperature heat source to armature 40 or a chemical agent or compound to the finished end 27″ of positioning assembly 27.

In addition, depending on the material with which the removable armature 40 is manufactured, it may be desirable to coat the outer surface of removable armature 40 with some type of surface treatment that will not significantly adhere to nor adversely affect the composite material 50, such as a silicone lubricant. If the removable armature 40 is formed of a moldable silicone having a low enough durometer rating or another similar material, it is possible that the need for additional substances or compounds between the fiber holder 30 and armature 40 as well as a surface treatment may be eliminated.

FIGS. 9-13 depict alternate embodiments of optical fiber positioning assemblies for use with multi-fiber cable. Such a cable 60 includes a plurality of optical fibers 61 that are spread out and supported in a known manner at 62 and fed into fiber holders 30. As depicted, cable 60 includes twelve optical fibers 61 although other numbers of optical fibers could be used by appropriately modifying the positioning assemblies.

Multi-fiber positioning assembly 65 includes a fixed block 70 and a removable block 80 positioned adjacent to the fixed block. Fixed block 70 is generally elongated and includes a plurality of bores 72 extending generally transverse to its longitudinal axis 73 and is configured to receive a fiber holder 30 within each bore. The details of the fiber holders and their interaction with optical fibers 61 are similar to those described above with respect to FIGS. 1-8. Fixed block 70 is intended to receive, support and retain the plurality of fiber holders 30 and may be cast or molded around the fiber holders 30 or may be formed separately and the individual fiber holders 30 subsequently inserted therein. In one embodiment, the fixed block may be molded of a silicone material having a relatively high durometer rating in order to generally position the fiber holders 30 as well as the optical fibers 61 retained therein. Other materials such as resins, metals and other materials could be used to form fixed block 70. An alignment pin receiving recess 74 may be located on the front face 75 of fixed block 70 adjacent the outer edges 76 thereof.

Removable block 80 is shaped similarly to fixed block 70 in that it is generally elongated and has a plurality of bores 82 extending generally transverse to its longitudinal axis 83. Bores 82 are spaced apart the same distance along longitudinal axis 83 as the bores 72 are spaced along longitudinal axis 73 of fixed block 70. Fiber holders 30 extend through both fixed block 70 and removable block 80 with the removable block 80 positioned between fixed block 70 and the ends 39 of fiber holders 30. The outer edges 84 of removable block 80 may include sloped surfaces 85 so that removable block 80 is wider in the longitudinal direction generally adjacent the ends 39 of fiber holders 30 as compared to the width adjacent to fixed block 70. The sloped side surfaces 85 simplify removal of block 80 and provide increased clearance for subsequent access to fiber holders 30 and fibers 61 within the composite structure 50 after the block 80 is removed.

Removable block 80 is configured so as to be removable from the fiber holders 30 after the multi-fiber positioning assembly 65 is embedded within composite structure 50 and the structure is cut along a line in a manner similar to that described above with respect to cut line 53. Removable block 80 may be formed of a low durometer silicone as such material could be molded around the fiber holders 30 and the silicone material would exert sufficient force on the fiber holders to retain the removable block in place yet permit the removable block to be slid off of the fiber holders when desired. In the alternative, another material such as resin, metals or other materials could be used provided that they would not be degraded by the chemicals, temperatures and pressure encountered during the composite structure manufacturing process. When using such other materials, it may be desirable to add a substance or compound between the fiber holders 30 and the removable block 80 in order to create or improve the temporary bond between the fiber holders and the removable block 80. As described above with respect to the single fiber positioning assembly 27, such compounds could include a releasable adhesive or wax or other material that would permit subsequent removal of the removable block 80 after the application of a relatively low temperature heat source or chemical agent or compound.

Use of the multi-fiber positioning assembly is similar to the use of the single fiber positioning assembly. When using the multi-fiber positioning assembly 65 during the process of manufacturing composite structures, the various plies are stacked and consolidated to form the desired composite structure 50 with a length of multi-fiber cable 60 positioned between certain layers. Either before, during or after the process of laying the multi-fiber cable 60 between the plies that ultimately form composite structure 50, the end of each optical fiber 61 is slid into its fiber holder 30 and, if desired, an epoxy or other material may be applied to the bores of the fiber holders in order to secure the optical fibers in place. As with the single fiber positioning assembly 27, the multi-fiber positioning assembly 65 having the optical fibers 61 positioned therein is ultimately positioned within the various plies of the composite structure and may be positioned generally adjacent a rough edge of the composite structure with the removable block 80 extending across or spanning the line at which the composite structure will be cut in order to form a desired finished edge of the composite structure.

Upon cutting the structure at its cut line, removable block 80, fiber holders 30 and optical fibers 61 are likewise cut along the cut line (e.g., at 87 in FIG. 9) and ends thereof are thus aligned with the finished edge of the composite structure. The remaining portion of removable block 80 may be slid off of the fiber holders 30 (downward as viewed in FIG. 9) and out of composite structure 50 in order to create an opening or void in the finished edge of the composite structure that is the size and shape of the remaining portion of removable block 80. The opening in the finished edge of structure 50 should be sufficiently large so as to permit polishing of the ends of the optical fibers 61 and fiber holders 30 yet sufficiently small so as not to affect the structural integrity of the composite structure 50. If desired, screws (not shown) may be screwed into the front face 86 of removable block 80 between the outermost fiber holders 30 and the sloped surface 85 in order to facilitate the gripping and removal of the removable block 80 from the composite structure 50. Removal of removable block 80 from the edge of composite structure 50 exposes alignment pin receiving recesses 74 of fixed block 70 adjacent the outer edges thereof. The sloped surfaces 85 of removable block 80 create additional access within composite structure 50 for polishing the optical fibers 61 and fiber holders 30 as well as facilitating the insertion of an alignment pin 93 into each pin receiving recess 74.

Once the removable block 80 has been removed from the finished edge of structure 50, the ends of the optical fibers 61 and fiber holders 30 may be polished to a desired finished and/or shape. A tubular alignment sleeve 90 (FIG. 11) for precisely aligning optical fibers may be slid onto each fiber holder 30 and the alignment sleeves are subsequently captured by a housing 92. Alternatively, the alignment sleeves could be formed as an integral part of housing 92. A portion of the alignment sleeves 90, housing 92 and the alignment pins 93 extend out of composite structure 50 past the finished edge a sufficient distance so as to permit insertion and proper alignment of an external multi-fiber assembly 94. As depicted, the external multi-fiber assembly 94 is identical to multi-fiber positioning assembly 65 after the removable block 80 has been removed and with the optical fibers 61 and fiber holders 30 cut to a desired length and appropriately shaped and/or polished. Other types of external multi-fiber assemblies may also be used.

Referring to FIGS. 12-13, still another alternate embodiment of a multi-fiber positioning assembly 110 is disclosed. Multi-fiber positioning assembly 110 is identical to multi-fiber positioning assembly 65 except that the fixed block 70 has been omitted. During assembly, the individual fiber holders 30 are either inserted into removable block 80 or the fiber holders are secured in position and the removable block 80 is molded around the individual fiber holders. As such, the multi-fiber positioning assembly 110 is essentially identical to the single fiber positioning assembly 27 except that it includes and has been modified to receive multiple fiber holders. In contrast to multi-fiber positioning assembly 65 that uses fixed block 70 and as with the single fiber positioning assembly 27, the material used to form the composite structure forms around the multiple fiber holders 30 and secures them generally in their desired locations within the composite structure. Composite structure 50 and multi-fiber positioning assembly 110 are trimmed and subsequently processed as described above with respect to multi-fiber positioning assembly 65. The exposed optical fibers and fiber holders may mate with a housing similar to housing 92 and include alignment sleeves similar to alignment sleeves 90 or another external multi-fiber connector.

Although the Present Disclosure provided has been described in terms of illustrated embodiments, it is to be understood that the Present Disclosure is not to be interpreted as limiting. Various alterations and modifications will no doubt become apparent to those skilled in the art after having read the above Present Disclosure. For example, while described in the context of a composite structure, the positioning assemblies disclosed herein could be used with optical fibers embedded in other types of materials. Numerous other embodiments, modifications and variations within the scope and spirit of the appended claims will occur to persons of ordinary skill in the art from a review of the Present Disclosure.

What is claimed is:

1. An optical fiber positioning assembly for embedding within a structure, the positioning assembly comprising:
    a fiber holder with an inner bore and an outer surface, the inner bore having a bore diameter and being configured to receive a length of optical fiber therein, the optical fiber having an optical fiber diameter, the bore diameter being slightly larger than the optical fiber diameter; and
    a removable armature secured directly to a portion of the outer surface of the fiber holder and being removably positioned around a portion of the fiber holder, the removable armature being formed of a glass material chemically removable through contact with acetic acid.

2. The optical positioning assembly of claim 1, further including a plurality of spaced apart, generally parallel fiber holders, each for receiving a length of an optical fiber therein, and the removable armature extends between and is secured directly to a portion of the outer surface of each of the fiber holders.

3. The optical fiber positioning assembly of claim 2, further including an alignment block secured to at least some of the fiber holders.

4. The optical fiber positioning assembly of claim 3, wherein the alignment block is secured to one section of the fiber holders and the removable armature is secured directly to another section of the fiber holders.

5. The optical fiber positioning assembly of claim 4, wherein the alignment block includes an alignment guide and access to the alignment guide is limited by the removable armature.

6. The optical fiber positioning assembly of claim 1, wherein the fiber holder is generally tube shaped.

7. The optical fiber positioning assembly of claim 1, wherein the fiber holder is a silica capillary with an inner bore having a diameter of approximately 125 microns and an outer surface having a diameter of approximately 1.25 millimeters.

8. A method of terminating an embedded optical fiber, comprising the steps of:
    providing an optical fiber positioning assembly including a fiber holder having a length of optical fiber therein and a removable armature positioned about a portion of the fiber holder;
    forming a structure with the optical fiber positioning assembly embedded therein and extending across a cut line along which the structure will be cut;
    cutting the structure along the cut line and through the optical fiber positioning assembly to expose a remaining portion of the removable armature positioned adjacent an edge of the structure; and
    removing the remaining portion of the removable armature from adjacent the edge of the structure to create an opening in the edge of the structure with an operative portion of the fiber holder and an operative portion of the optical fiber located therein.

9. The method of claim 8, further including polishing an exposed end of the operative portion of the optical fiber.

10. The method of claim 9, further including providing an alignment sleeve having first and second sections and, after the removing step, inserting the first section of the alignment sleeve into the opening in the edge of the structure while maintaining the second section outside the opening in the edge and with the exposed end of the optical fiber being positioned within the first section of the alignment sleeve.

11. The method of claim 8, wherein the removing step includes sliding the removable armature from the operative portion of the fiber holder.

12. The method of claim 11, wherein the sliding step includes sliding the removable armature in a direction generally parallel to a longitudinal axis of the optical fiber.

13. The method of claim 8, wherein the removing step includes chemically removing the removable armature.

14. The method of claim 13, wherein the removable armature is formed of glass and the removing step includes exposing the removable armature to acetic acid.

* * * * *